United States Patent
Kucharski et al.

(10) Patent No.: US 12,107,994 B2
(45) Date of Patent: Oct. 1, 2024

(54) METHOD AND DEVICE FOR PROMPTING A USER TO REPORT A PUBLIC-SAFETY INCIDENT

(71) Applicant: MOTOROLA SOLUTIONS, INC., Chicago, IL (US)

(72) Inventors: Wojciech Kucharski, Debica (PL); Mateusz Smetek, Skala (PL); Pawel Smietana, Cracow (PL); Grzegorz Kaplita, Rzeszow (PL); Dominik Wojtaszek, Debica (PL); Andrzej Bukowski, Tarnobrzeg (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 370 days.

(21) Appl. No.: 17/662,850

(22) Filed: May 11, 2022

(65) Prior Publication Data
US 2023/0370548 A1    Nov. 16, 2023

(51) Int. Cl.
*H04M 11/04* (2006.01)
*G06Q 50/26* (2012.01)
*H04M 3/51* (2006.01)
*H04W 4/90* (2018.01)

(52) U.S. Cl.
CPC ........ *H04M 3/5116* (2013.01); *G06Q 50/265* (2013.01); *H04W 4/90* (2018.02)

(58) Field of Classification Search
CPC ..... H04M 3/5116; H04W 4/90; G06Q 50/265
See application file for complete search history.

(56) References Cited

U.S. PATENT DOCUMENTS

| | | |
|---|---|---|
| 6,614,348 B2 | 9/2003 | Ciccolo et al. |
| 6,850,824 B2 | 2/2005 | Breed |
| 8,131,012 B2 | 3/2012 | Eaton et al. |

(Continued)

FOREIGN PATENT DOCUMENTS

| | | |
|---|---|---|
| CN | 1848742 A | 10/2006 |
| WO | 2002033529 A2 | 4/2002 |
| WO | 2021256941 A1 | 12/2021 |

OTHER PUBLICATIONS

The International Search Report and the Written Opinion, corresponding patent application No. PCT/US2023/019247 filed: Apr. 20, 2023, mailed: Jul. 3, 2023, all pages.

*Primary Examiner* — Moustapha Diaby
(74) *Attorney, Agent, or Firm* — Raguraman Kumaresan

(57) ABSTRACT

A process for prompting a user to report a public-safety incident. In operation, an electronic computing device captures sensor data via one or more sensor devices communicatively coupled to the electronic computing device. The device uses the captured sensor data to detect an occurrence of a potential public-safety incident and further monitors whether a user operating the device has not reported the safety incident to an identified public-safety agency. If the user does not report the incident, then the device identifies a time window as a function of as a function of one or more of user availability, user health and/or mental status, user convenience, user privacy, user safety or severity of the potential public-safety incident, or predefined user input. The device then provides a visual and/or audio prompt for prompting the user to report the incident to the public-safety agency during the identified time window.

20 Claims, 5 Drawing Sheets

(56) References Cited

U.S. PATENT DOCUMENTS

| | | |
|---|---|---|
| 8,396,447 B2 | 3/2013 | Reich et al. |
| 9,277,349 B2 | 3/2016 | Mankowski et al. |
| 9,717,101 B1 | 7/2017 | Burnham |
| 10,136,295 B1 | 11/2018 | Chee et al. |
| 10,540,883 B1* | 1/2020 | Keil ................. G10L 25/51 |
| 11,259,166 B1 | 2/2022 | Lim et al. |
| 11,823,674 B2* | 11/2023 | Furman ............. G06Q 50/265 |
| 2002/0120371 A1 | 8/2002 | Leivian et al. |
| 2004/0111377 A1 | 6/2004 | Teberg et al. |
| 2013/0232427 A1* | 9/2013 | Romero ............. H04L 65/403 715/753 |
| 2018/0189913 A1* | 7/2018 | Knopp ............... H04W 4/021 |
| 2019/0012341 A1* | 1/2019 | Proctor ............. G06F 16/2477 |
| 2020/0382629 A1* | 12/2020 | Reagan .............. G06F 21/31 |
| 2021/0104001 A1* | 4/2021 | Knopp ............... G06Q 50/265 |
| 2021/0186329 A1 | 6/2021 | Tran |

* cited by examiner

METHOD AND DEVICE FOR PROMPTING A USER TO REPORT A PUBLIC-SAFETY INCIDENT

BACKGROUND

Individuals can help with preventing and solving crimes in a community by sharing information with public-safety agencies. There are several ways for individuals to report public-safety incidents to public-safety agencies. One way to report public-safety incidents is by calling a dedicated emergency number. Another way is to anonymously submit tips through submission services made available by public-safety agencies. However, some circumstances may prevent individuals witnessing public-safety incidents from either not reporting in a timely manner or not reporting at all. In some cases, individuals witnessing certain incidents may not realize the severity of such incidents based on what they initially witnessed and may decide not to report the incidents. Accordingly, what is needed is a mechanism for prompting individuals witnessing public-safety incidents to report such incidents to public-safety agencies.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
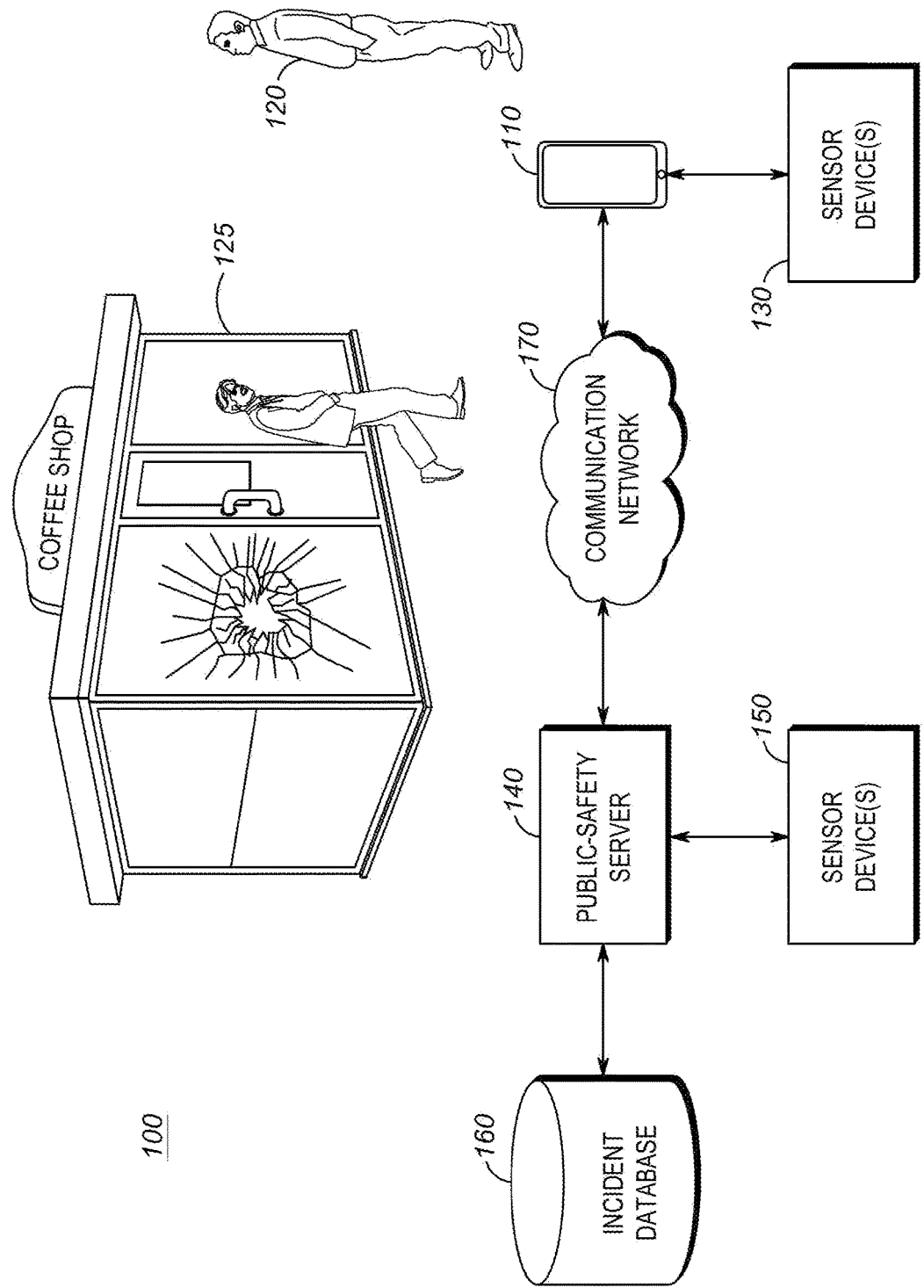
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As discussed above, users witnessing public-safety incidents may either fail to report incidents or may not report incidents in a timely manner. There are many circumstances that may prevent a user from reporting an incident in a timely manner, Assume a user witnesses a public-safety incident (e.g., a vandalism incident involving perpetrators breaking windows of a store) while driving a vehicle and the user decides that it is not safe to stop the vehicle due to traffic or road conditions or due to imminent danger arising from the incident itself. In this case, it is possible that the user may choose not to report the incident immediately for safety or other reasons. It is also possible that the user may not remember to report the incident, as the user carries on with other activities. If citizens do not report incidents, agencies may lose the opportunity to properly investigate and respond to the incidents and further establish checks, procedures, and implement risk controls to prevent such incidents from happening again. Public-safety agencies therefore cannot effectively function without engagement from the public. Accordingly, a technological solution can help increase engagement and strengthen collaboration between public-safety agencies and the citizens.

Disclosed below is a technical process for prompting a user to report a public-safety incident, wherein the process employs electronic sensor devices to detect an occurrence of a potential public-safety incident and to further identify a time window while taking into consideration unique circumstances such as safety, privacy, health etc., of a user who witnessed the incident in order to prompt the user to report the incident during the identified time window.

One embodiment provides a method of prompting a user to report a public-safety incident. The method comprises: capturing, at an electronic computing device, sensor data via one or more sensor devices communicatively coupled to the electronic computing device; detecting, at the electronic computing device, that the captured sensor data indicates an occurrence of a potential public-safety incident; determining, at the electronic computing device, that a user operating the electronic computing device has not reported the potential public-safety incident to an identified public-safety agency; identifying, at, the electronic computing device, a time window for prompting the user to report the potential public-safety incident to the identified public-safety agency; and providing, at the electronic computing device, during the identified time window, a visual and/or audio prompt for prompting the user to report the potential public-safety incident to the identified public-safety agency.

Another embodiment provides an electronic computing device including one or more sensor devices; a visual and/or audio output component; and an electronic processor communicatively coupled to the one or more sensor devices and the visual and/or audio output component. The electronic processor is configured to: capture sensor data via the one or more sensor devices; detect that the captured sensor data indicates an occurrence of a potential public-safety incident; determine that a user operating the electronic computing device has not reported the potential public-safety incident to an identified public-safety agency; identify a time window for prompting the user to report the potential public-safety incident to the identified public-safety agency; and provide, via the visual and/or audio output component, a visual and/or audio prompt for prompting the user to report the potential public-safety incident to the identified public-safety agency.

A further embodiment provides a method of prompting a user to report a public-safety incident. The method comprises: capturing, at a public-safety server, sensor data via one or more sensor devices communicatively coupled to the public-safety server; detecting, at the public safety server, that the captured sensor data indicates occurrence of a potential public-safety incident; identifying, at the public-safety server, a user who has witnessed and/or experienced the potential public-safety incident; determining, at the public-safety server, that the user has not reported the potential public-safety incident to an identified public-safety agency; identifying, at the public-safety server, a time window for prompting the user to report the potential public-safety incident to the identified public-safety agency; and transmitting, at the public-safety server, during the identified time window, a visual and/or audio prompt to an electronic computing device operated by the user for prompting the user to report the potential public-safety incident to the identified public-safety agency.

Each of the above-mentioned embodiments will be discussed in more detail below, starting with example system and device architectures of the system in which the embodiments may be practiced, followed by an illustration of processing blocks for achieving an improved technical method and system for prompting a user to report a public-safety incident. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, an example of a system 100 implementing a process for prompting a user to report a public-safety incident is shown. The system 100 includes an electronic computing device 110 operated by or otherwise associated with a user 120 and one or more sensor devices 130 communicatively coupled to the electronic computing device 110. The user 120 may operate any type of electronic computing device 110 suitable for use in prompting the user 120 to report a public-safety incident (e.g., vandalism incident 125 shown in FIG. 1). The electronic computing device 110 may include one or more of mobile devices, smart phones, personal computers, laptop computers, tablets, or any such device the user 120 operates for receiving prompts for reporting a potential public-safety incident witnessed by the user 120. The sensor devices 130 employed by the electronic computing device 110 may include sensors configured to capture audio, images, and other forms of sensor data corresponding to a monitored area. For example, the sensor devices 130 include, but not limited to, audio sensors (e.g., microphone), video sensors (e.g., a camera or other device), infrared sensors, sonar sensors, radar sensors, smoke detectors, carbon monoxide detectors, thermal cameras, heat sensors, chemical, biological, radiological, nuclear, or explosive (CBRNE) sensors, biometric sensors, smell sensors, motion sensors (such as light sensor, accelerometer, magnetometer, and/or gyroscope), and the like. In one embodiment, one or more of the sensor devices 130 are built into the electronic computing device 110. In another embodiment, one or more of the sensor devices 130 are disposed separately from the electronic computing device 110 and further configured to capture and communicate the sensor data to the electronic computing device 110, for example, via a direct-mode air interface link without any intervening infrastructure between them. For example, one or more of the sensor devices 130 may be integrated within user wearable items including belts, smart glasses, gloves, watches, and the like. In one embodiment, the electronic computing device 110 and the sensor devices 130 may form a personal area network in accordance with one or more direct-mode air-interface protocols, such as Bluetooth, near field communication (NFC), Infrared Data Association (IrDA), ZigBee, direct-mode land-mobile-radio (LMR), and/or Wi-Fi (Wireless Fidelity), as long as the electronic computing device 110 and the sensor devices 130 are within mutual transmission range of one another. In accordance with some embodiments, the electronic computing device 110 uses the sensor data captured by the sensor devices 130 to detect occurrence of a potential public-safety incident and to further determine whether the user 120 who is detected to have been witnessed and/or experienced the potential public-safety incident should be prompted to report the incident.

The user 120 is any person who has been detected by the electronic computing device 110 to have witnessed a potential public-safety incident and further has a piece of information to communicate to a public-safety agency (e.g., police, fire, emergency medical service, city municipality etc.,). For example, the user 120 may be a member of the public who is registered with the electronic computing device 110 and/or a public-safety server 140 to receive prompts for reporting emergency incidents (e.g., fire) or some quality of life issues (e.g., excessive potholes in the street) that the user has witnessed or has been experiencing. The term "incident" may refer to an event, occurrence, or situation (e.g., a traffic accident, public disturbance, medical emergency, fire, broken water meter or power line, etc.) that should be reported for investigation and/or resolution by public-safety agencies.

In accordance with embodiments, the electronic computing device 110 employs the sensor devices 130 to capture sensor data and further use the captured sensor data to automatically detect occurrence of a potential public-safety incident as well as to further detect that the user 120 operating the electronic computing device 110 has witnessed and/or experienced the potential public-safety incident. In accordance with some embodiments, the electronic computing device 110 monitors, for example, via the captured sensor data or based on inputs detected at the electronic computing device 110 or another device operated by the user 120, whether the user 120 who has witnessed the potential public-safety incident has reported the incident to a public-safety agency, for example, a particular public-safety agency identified by the electronic computing device 110 as being responsible for investigating and/or responding to a particular category of incident witnessed by the user. If the user has not reported the potential public-safety agency, for example, within a predefined time duration from a time of occurrence of the incident or if the user has reported the incident to an agency other than the public-safety agency identified by the electronic computing device 110, the electronic computing device 110 determines a time window for prompting the user to report the potential public-safety incident to the identified public-safety agency. In accordance with embodiments, the electronic computing device 110 identifies the time window as a function of one or more of user availability, user health and/or mental status, user convenience, user privacy, user safety, type or severity of the potential public-safety incident, or a predefined user input. The electronic computing device 110 then provides a visual and/or audio prompt to the user 120 during the identified, time window. The visual and/or audio prompt may act as a reminder for the user 120 to report the potential public-safety incident to the identified public-safety agency. The visual and/or audio prompt may also include incident information (e.g., time, location, and type of incident, sensor data etc.,) as well as information (e.g., contact information) about the public-safety agency to assist the user in reporting the incident. For example, the user 120 may be prompted to call a dedicated phone number (e.g., 911) to report the incident. Alternatively, the user 120 may be prompted to report the incident via other available mechanisms including sending an electronic mail or short message service (SMS) message, filling out a form on a web page, or through any other suitable technique. In one embodiment, the visual and/or audio prompt may include an electronic address such as a uniform resource locator (URL) of a web page designed for tip submission purposes. In response, the user 120 may submit an electronic tip by filling and submitting a tip submission form on the web page. The electronic tip may take the form of text, audio, image, or video data. In addition, tip metadata identifying one or more of the date of tip submission, time of tip submission, location and network address (e.g. internet protocol (IP) address) associated with the user 120 may be automatically submitted along with the electronic tip. In some embodiments, in order to preserve the anonymity of the user 120, the electronic computing device 110 may remove any sensitive data (e.g., location of the user 120, IP address associated with the user 120 etc.,) connecting the electronic tip to the user 120 prior to submitting the electronic tip to the public-safety agency.

In accordance with embodiments, the system 100 further includes a public-safety server 140 and one or more sensor devices 150 communicatively coupled to the public-safety server. The public-safety server 140 may be maintained and/or operated by one or more public-safety agencies. In accordance with embodiments, the public-safety server 140 executes functions similar to the electronic computing device 110 for the purposes of prompting the user 120 to report a public-safety incident potentially witnessed by the user 120. In accordance with some embodiments, the user 120 may be required to be registered with the public-safety server before the user 120 can receive a prompt to report an incident witnessed by the user 120. The sensor devices 150 are similar to sensor devices 130 and may similarly include sensors configured to capture audio, images, and other forms of sensor data corresponding to a monitored area. For example, the sensor devices 150 similarly include, but not limited to, audio sensors (e.g., microphone), video sensors (e.g., a camera or other device), infrared sensors, sonar sensors, radar sensors, smoke detectors, carbon monoxide detectors, thermal cameras, heat sensors, chemical, biological, radiological, nuclear, or explosive (CBRNE) sensors, biometric sensors, smell sensors, motion sensors (such as light sensor, accelerometer, magnetometer, and/or gyroscope), and the like.

In accordance with some embodiments, the public-safety server 140 uses the sensor data captured from the sensor devices 150 (e.g., a surveillance camera) to detect an occurrence of a potential public-safety incident and to further determine whether a user 120 who has been identified to have witnessed and/or experienced the public-safety incident (e.g., vandalism incident 125) should be prompted to report the potential public-safety incident. As an example, assume the public-safety server 140 detects an occurrence of a potential public-safety incident (e.g., vandalism incident 125) using audio data (e.g., audio data capturing breaking window noise) captured by a sensor (e.g., microphone) corresponding to a monitored area (e.g., a store front). In this example, further assume that the public-safety server 140 detects the presence of a user (e.g., user 120) in the monitored area using sensor data (e.g., video data identifying the user 120) captured by a sensor device 150 (e.g., surveillance camera) deployed in the monitored area. In this example, the public-safety server 140 may prompt the user 120 (for example, when the user 120 is registered with the server 140 to receive prompts for reporting incidents) to report the potential public-safety incident (e.g., vandalism incident 125) if the user has not already reported the incident to a public-safety agency, for example, a particular public-safety agency identified by the public-safety server 140 as being responsible for responding to a particular category of incident detected by the public-safety server 140. In accordance with some embodiments, the public-safety server 140 maintains or has access to an incident database 160 which stores information related to different reported incidents. The incident database 160 is housed on suitable database servers that may be owned and/or operated by one or more public-safety agencies. In one embodiment, the public-safety server 140 determines whether an incident detected by the public-safety server 140 using the sensor data captured by the sensor devices 150 has already been reported (whether by the same user 120 or some other user) based on incident data stored in the incident database 160. If the incident database 160 does not include incident information (e.g., location, type of incident etc.,) relevant to the potential public-safety incident (e.g., vandalism incident 125) detected by the public-safety server 140, then the public-safety server 140 instructs a device (e.g., electronic computing device 110) operated by the user (i.e., the user 120 identified as being present in the monitored area at the time of detecting the incident) to prompt the user 120 to report the incident. In this case, the public-safety server 140 may communicate with an electronic computing device 110 associated with the user 120 to identify a time window for reminding the user 120 to report the public-safety incident to the identified public-safety agency. In accordance with embodiments the public-safety server 140 identifies the time window as a function of one or more of user availability, user health and/or mental status, user convenience, user privacy, user safety, type or severity of the potential public-safety incident, or a predefined user input. The public-safety server 140 then transmits a visual and/or audio prompt during the time window to remind the user 120 to report the potential public-safety incident to the identified public-safety agency. On the other hand, if the incident database 160 already includes specific incident information such as location and type of the public-safety incident detected by the public-safety server 140, then the public-safety server 140 may refrain from prompting the user 120 to report the incident.

In accordance with embodiments, the electronic computing device 110 and/or the public safety server 140 executes the process of prompting the user to report a public-safety incident only when the user 120 has already registered with the electronic computing device 110 and/or the public-safety server 140 and has further authorized/permitted the electronic computing device 110 and/or the public-safety server 140 to process sensor data including user identifiable information (e.g., face identity) captured corresponding to a monitored area for the limited purpose of reminding the user 120 to report a potential public-safety incident witnessed by the user 120. Further, in these embodiments, the electronic computing device 110 and/or the public safety server 140 may be programmed to store the sensor data for the limited purpose of reminding the user 120 to report an incident. If the electronic computing device 110 and/or the public-safety server 140 receive a user input indicating that the user 120 will not be reporting the incident or if a predefined time duration from a time of occurrence of the potential public-safety incident expires, the electronic computing device 110 and/or the public-safety server 140 may automatically delete the stored sensor data unless overridden by another policy (e.g., a legal hold) requiring the retention of stored sensor data.

The electronic computing device 110, the public-safety server 140, and other entities in the system 100 communicate with one another via one or more communication networks 170. The communication network 170 includes wireless and wired connections. For example, the communication network 170 may be implemented using a wide area network, such as the Internet, a local area network, such as a Wi-Fi network, and personal area or near-field networks, for example a Bluetooth™ network. Portions of the communications network 170 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

While only one electronic computing device 110 is shown as being included in the system 100, the system 100 may include any number of electronic computing devices 110, where each electronic computing device 110 may be operated by a different user for the purpose of prompting the user to report a corresponding public-safety incident detected by the electronic computing device. Similarly, the system 100 may include any number of public-safety servers 140, where each public-safety server 140 may be operated by a different public-safety agency to detect category of public-safety incidents that the particular agency is responsible for investigation or resolution and to further prompt users registered with the public-safety server 140 to report the detected incidents.

Figure 2:
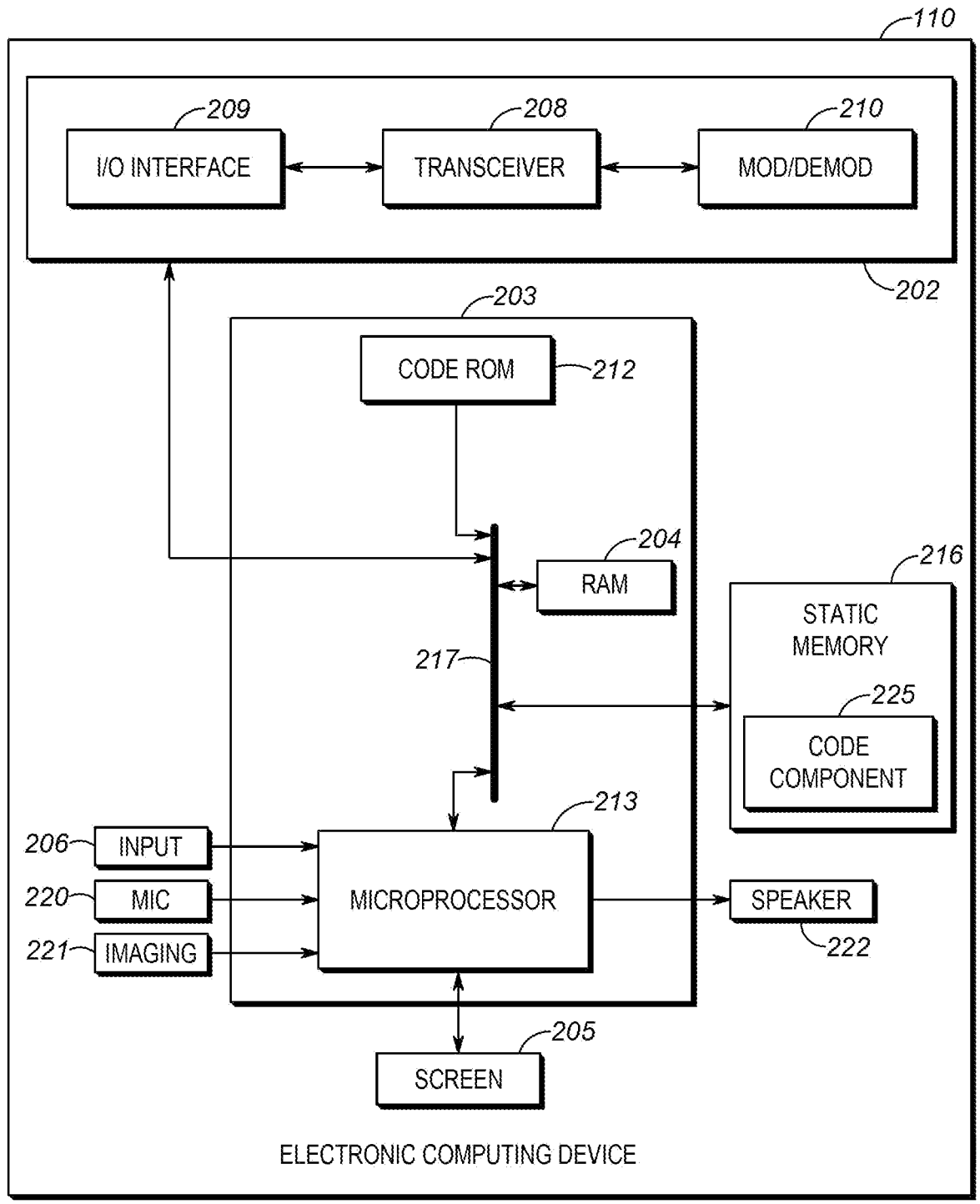
FIG. 2 is a block diagram of an electronic computing device shown in FIG. 1 in accordance with some embodiments.

FIG. 2 is an example functional block diagram of an electronic computing device 110 operating within the system 100 in accordance with some embodiments. The electronic computing device 110 may be embodied in computing systems not illustrated in FIG. 1, and/or may be a distributed computing device across two or more of the foregoing (or multiple of a same type of one of the foregoing) and linked via a wired and/or wireless communication link(s). While FIG. 2 represents an electronic computing device 110 described above with respect to FIG. 1, depending on the type of system, the electronic computing device 110 may include fewer or additional components in configurations different from that illustrated in FIG. 2.

As shown in FIG. 2, the electronic computing device 110 includes a communications unit 202 (also referred to as "communication interface") coupled to a common data and address bus 217 of a processing unit 203. The communications unit 202 sends and receives data to and from other devices in the system 100. The communications unit 202 may include one or more wired and/or wireless input/output (I/O) interfaces 209 that are configurable to communicate with other devices in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202.

Figure 3:
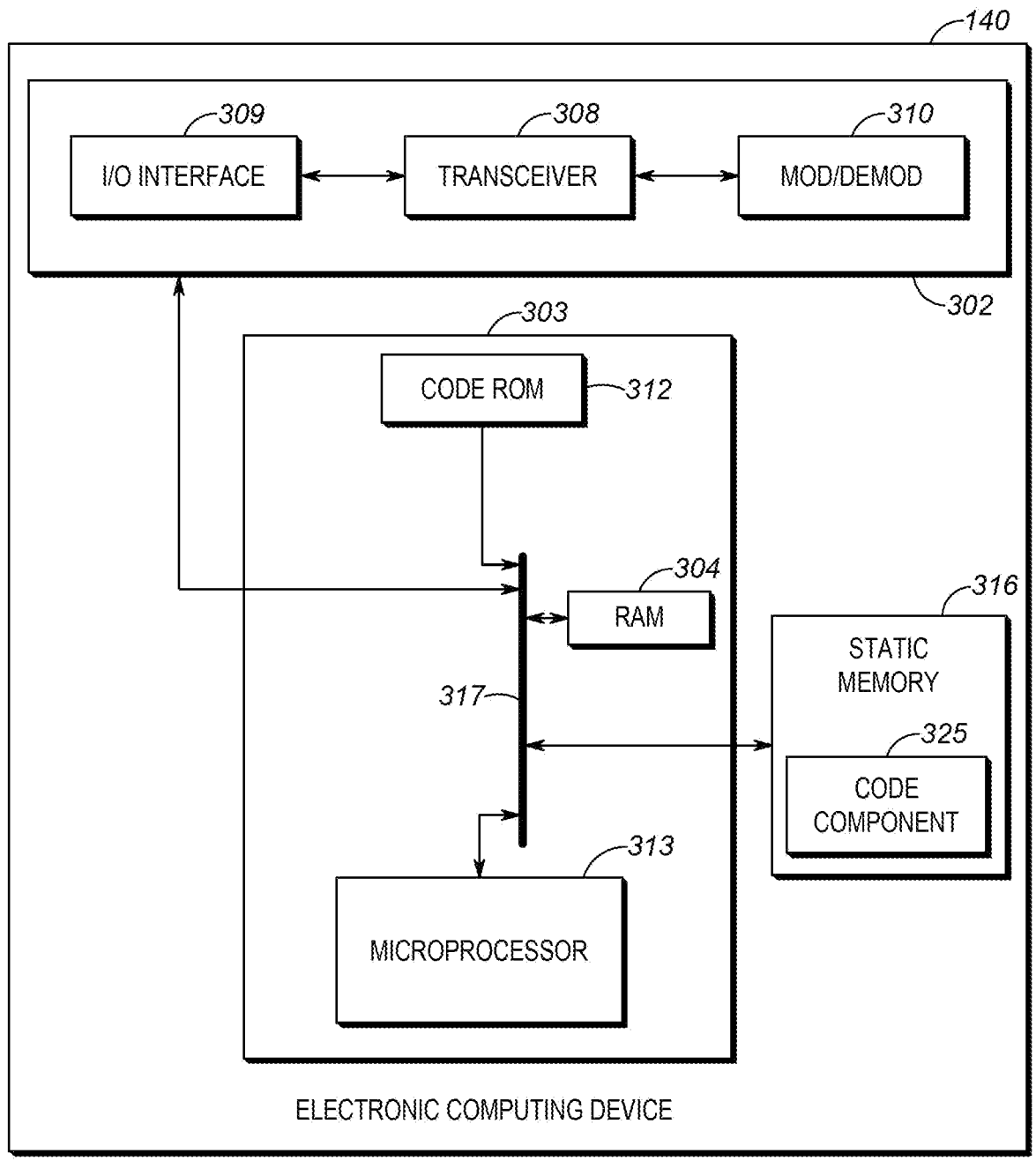
FIG. 3 illustrates a block diagram of a public-safety server shown in FIG. 1 in accordance with some embodiments.

Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. In accordance with some embodiments, the static memory 216 may have access to or otherwise temporarily store sensor data captured by the sensor devices 130.

The electronic computing device 110 may also include one or more input devices (for example, keypad, pointing device, touch-sensitive surface button, a microphone 220, an imaging device 221, and/or a user input interface device 206) and an electronic display screen 205, each coupled to be in communication with the processing unit. The electronic display screen 205 (also referred herein as a visual output component) may be provided for displaying images, video, and/or text to the user 120 or to someone else. In accordance with some embodiments, the electronic computing device 110 provides a visual, prompt via the display screen 205 to remind the user 120 to report a public-safety incident. The display screen 205 may be, for example, a liquid crystal display (LCD) screen or an organic light emitting display (OLED) display screen. In some embodiments, a touch sensitive input interface may be incorporated into the display screen 205 as well, allowing the user 120 to interact with content provided on the display screen 205.

In accordance with some embodiments, microphone 220 and/or imaging device 221 may act as sensor devices 130 shown in FIG. 1 to capture sensor data in the form of real-time digital audio and,/or video stream. For example, the microphone 220 may be present for capturing audio from a user and/or other environmental or background audio (e.g., breaking window noise associated with the vandalism incident shown in FIG. 1) that is further processed by the processing unit 203 in accordance with the remainder of this disclosure. The imaging device 221 provides video (still or moving images) of a field-of-view associated with the user 120, perhaps capturing an incident scene including a suspect and the suspect's surroundings, for further processing by the processing unit 203. A speaker 222 may be present for reproducing audio that is decoded from voice or audio streams of calls received via the communications unit 202, or for playing back alert tones or other types of pre-recorded audio. In accordance with some embodiments, the electronic computing device 110 may provide an audio prompt via the speaker 222 (also referred herein as an audio output component) to remind the user 120 to report a public-safety incident.

FIG. 3 is an example functional block diagram of a public-safety server 140 operating within the system 100 in accordance with some embodiments. The public-safety server 140 may be embodied in computing systems not illustrated in FIG. 1, and/or may be a distributed computing device across two or more of the foregoing (or multiple of a same type of one of the foregoing) and linked via a wired and/or wireless communication link(s). While FIG. 3 represents a public-safety server 140 described above with respect to FIG. 1, depending on the type of system, the public-safety server 140 may include fewer or additional components in configurations different from that illustrated in FIG. 2.

As shown in FIG. 3, the public-safety server 140 includes a communications unit 302 (also referred to as "communications interface") coupled to a common data and address bus 317 of a processing unit 303. The communications unit 302 sends and receives data to and from other devices in the system 100. The communications unit 302 may include one or more wired and/or wireless input/output (I/O) interfaces 309 that are configurable to communicate with other devices in the system 100. For example, the communications unit 302 may include one or more wireless transceivers 308. such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The processing unit 303 may include an encoder/decoder with a code Read Only Memory (ROM) 312 coupled to the common data and address bus 317 for storing data for initializing system components. The processing unit 303 may further include an electronic processor 313 (for example, a microprocessor, a logic circuit, an application-specific integrated circuit, a field-programmable gate array, or another electronic device) coupled, by the common data and address bus 317, to a Random Access Memory (RAM) 304 and a static memory 316. The electronic processor 313 may generate electrical signals and may communicate signals through the communications unit 302.

Figure 5:
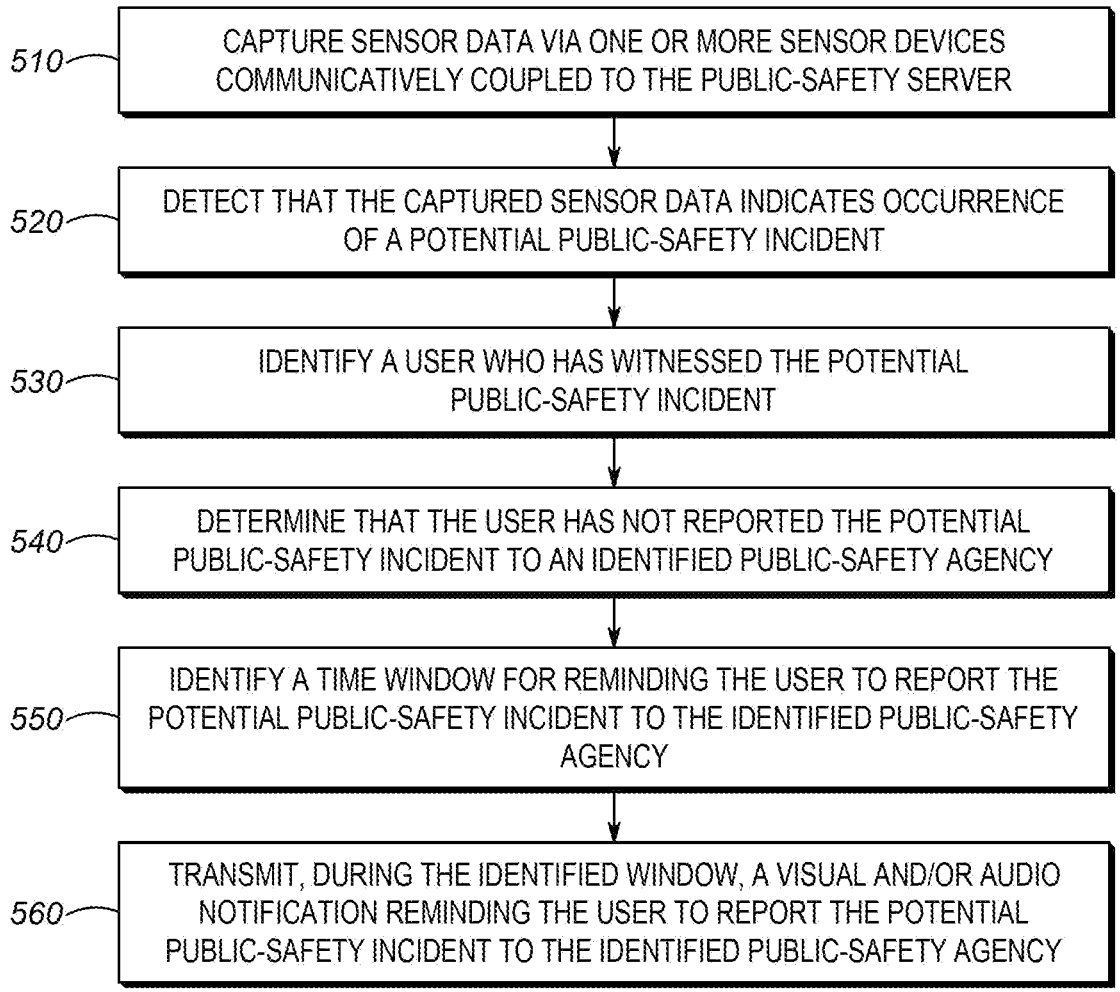
FIG. 5 illustrates a flowchart of another process for prompting a user to report a public-safety incident in accordance with some embodiments.

Static memory 316 may store operating code 325 for the electronic processor 313 that, when executed, performs one or more of the blocks set forth in FIG. 5 and the accompanying text(s). The static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. In accordance with some embodiments, the static memory 316 may have access to or otherwise temporarily store sensor data captured by the sensor devices 150.

Figure 4:
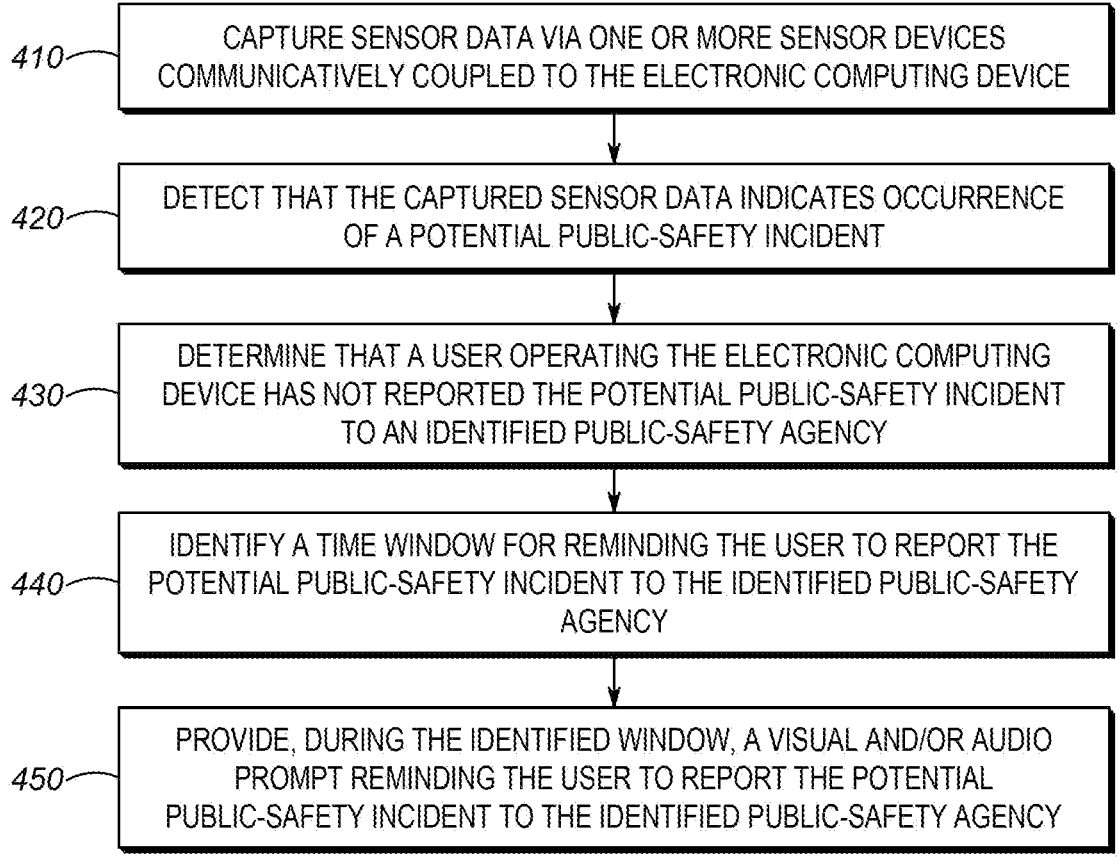
FIG. 4 illustrates a flowchart of a process for prompting a user to report a public-safety incident in accordance with some embodiments.

Turning now to FIG. 4, a flowchart diagram illustrates a process 400 for prompting a user to report a public-safety incident. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. The electronic computing device 110 shown in FIG. 1 and/or FIG. 2, and embodied as a singular computing device or distributed computing device may execute process 400 via an electronic processor 213.

The electronic computing device 110 may execute the process 400 at power-on, at some predetermined periodic time period thereafter, in response to a trigger raised locally at the electronic computing device 110 via an internal process or via an input interface or in response to a trigger from an external device to which the electronic computing device 110 is communicably coupled, among other possibilities. In accordance with some embodiments, the electronic computing device 110 may perform the process 400 only when a user 120 operating the electronic computing device 110 has authorized the electronic computing device 110 to prompt the user 120 to report an incident witnessed and/or experienced by the user 120.

The process 400 of FIG. 4 need not be performed in the exact sequence as shown and likewise various blocks may be performed in different order or alternatively in parallel rather than in sequence. The process 400 may be implemented on variations of the system 100 of FIG. 1 as well.

At block 410, the electronic computing device 110 captures sensor data via one or more sensor devices 130 communicatively coupled to the electronic computing device 110. The sensor data captured by the sensor devices 130 may include audio, image, video, text, or other forms of sensor data including sensor values captured by the sensor devices 130. In one embodiment, the sensor devices 130 may continuously, periodically, or in response to a user input capture sensor data corresponding to the user 120 and/or the user environment and send the captured sensor data for further processing by the electronic computing device 110 associated with the user 120. The sensor data may include one or more of audio, image, video, text, or other forms of sensor data captured corresponding to the user 120 and/or the user environment. In accordance with some embodiments, the sensor data may additionally include one or more of: sensor values (e.g., heart rate) captured and/or measured by the sensor device 130, sensor analytics data (e.g., analytics data indicating an abnormal sensor value pattern), an identifier identifying a particular sensor device 130 which captured the sensor data, timestamp indicating a time at which the sensor data was captured, and a location (e.g., GPS coordinates) at which the sensor data was captured.

At block 420, the electronic computing device 110 detects that the captured sensor data indicates occurrence of a potential public-safety incident. In accordance with some embodiments, the electronic computing device 110 processes the sensor data received from one or more of the sensor devices 130 to determine whether the captured sensor data indicates an occurrence of a potential public-safety incident. Assume a scenario where a vandalism incident (e.g., incident 125 shown in FIG. 1) occurs in the user environment and the incident involves one or more perpetrators who broke the glass window at a store front. In this scenario, it is possible that one or more of the sensor devices 130 monitoring the user 120 and/or the user environment may capture sensor data (e.g., audio, video, text, or other forms of sensor data) representing the user's reaction or response to the incident or of the user environment covering a scene of the incident. For example, a sensor device 130 such as a microphone communicatively coupled to the electronic computing device 110 may capture audio of the broken glass window as well as any statements made by the perpetrators while committing the vandalism incident. Also, a sensor device 130 such as a video camera communicatively coupled to the electronic computing device 110 may capture video of the perpetrators committing the vandalism incident. In any case, when the electronic computing device 110 receives the sensor data from one or more of the sensor devices 130, the electronic computing device 110 processes the sensor data to determine whether the sensor data indicates an anomalous event such as an occurrence of a vandalism incident In the above example scenario involving a vandalism incident, the electronic computing device 110 may process the audio received from a microphone via an audio analytics engine and further may determine that the audio which includes sound of a broken glass window is indicative of occurrence of a potential vandalism incident. In accordance with some embodiments, the electronic computing device 110 may process sensor data received from multiple sensor devices deployed at the same location during the time of occurrence of a particular event to verify the occurrence of a potential public-safety incident. For example, the electronic computing device 110 may additionally process the video received from a video camera using a video analytics engine and further determine that the video which captures perpetrators breaking the glass window at a store front is indicative of an occurrence of a potential vandalism incident.

In accordance with some embodiments, the electronic computing device 110 may further determine whether the user 120 has potentially witnessed and/or experienced the public-safety incident based on sensor data captured corresponding to the user's reaction or response to the occurrence of the incident. For example, a sensor device 130 such as a heart rate sensor implemented at a smart watch worn by the user 120 may measure the user's heart rate at the time of occurrence of the incident. In this case, the electronic computing device 110 may analyze sensor values representing the user's heart rate to determine if there is an abnormal increase (e.g., when the heart rate is higher than a predefined threshold) in the user's heart rate during or immediately after the occurrence of the detected incident. If there is an abnormal increase in the user's heart substantially at the same time as the occurrence of the incident, the electronic computing device 110 may determine that the user 120 might have witnessed and/or experienced (for example, the user 120 might, have heard the glass breaking noise even if the user 120 was not directly looking at the scene of the incident) the vandalism incident. The electronic computing device 110 may also rely on sensor data received from multiple sensor devices 130 to confirm whether the user 120 has witnessed and/or experienced the public-safety incident.

Next, at block 430, the electronic computing device 110 determines whether the user 120 operating the electronic computing device 110 has reported the potential public-safety incident to an identified public-safety agency. In accordance with embodiments, the electronic computing device 110 identifies a particular public-safety agency as being responsible for responding, investigating, or resolving the public-safety incident detected by the electronic computing device at block 420. The electronic computing device 110 may identify a public-safety agency based on a category of public-safety incident detected at block 420. As an example, when the electronic computing device 110 detects that the captured sensor data indicates a vandalism incident, the electronic computing device 110 may categorize the vandalism incident as an emergency incident requiring a response from a police agency. After identifying the public-safety agency to which the incident is to be reported, the electronic computing device 110 further monitors whether the user 120 has reported the public-safety incident to the identified public-safety agency. In one embodiment, the electronic computing device 110 monitors whether the user 120, in response to witnessing and/or experiencing the incident, has particularly launched a tip submission application or a web-page affiliated with the identified public-safety agency (e.g., police agency) and further submitted a tip linked to the public-safety incident detected at block 420 or alternatively has launched a call application and made a call to a phone number (e.g., 911) affiliated with the identified public-safety agency. Additionally or alternatively, the electronic computing device 110 may monitor inputs (e.g., user inputs received via the input interface 206 shown in FIG. 2) received at the electronic computing device 110 or another device associated with the user 120 to determine whether the user 120 has entered or submitted incident information related to the public-safety incident detected at block 420. The electronic computing device 110 may also process the outgoing calls (or messages) to determine whether the user 120 has reported (e.g., by making a 911 call) the public-safety incident after witnessing the incident. In another embodiment, in order to determine whether the user 120 operating the electronic computing device 110 has reported the incident to an identified public-safety agency, the electronic computing device 110 obtains permission (e.g., from the public-safety server 140) to temporarily access a public-safety incident database (e.g., incident database 160) affiliated with the identified public-safety agency. In this case, if the incident database 160 already includes one or more incident records linked (i.e., contains specific information matching time, location, or category of the detected public-safety incident) to the potential public-safety incident, then the electronic computing device 110 further determines whether the one or more incident records linked to the potential public-safety incident is missing relevant incident information (e.g., statements made by perpetrators while committing the incident and recorded by a microphone) captured in the sensor data. If the one or more incident records linked to the potential public-safety incident is missing relevant incident information captured in the sensor data, then the electronic computing device 110 determines that the user 120 operating the electronic computing device 110 has not reported the potential public-safety incident to an identified public-safety agency.

At block 430, if the electronic computing device 110 determines at block 430, that the user has not reported the public-safety incident or has reported the incident to an agency other than the one identified by the electronic computing device 110, then the electronic computing device 110 proceeds to execute blocks 440 and 450 of the process 400. On the other hand, if the electronic computing device 110 determines that the user 120 has already reported the public-safety incident to a public-safety agency (e.g., police agency) identified by the electronic computing device 110, then the electronic computing device 110 refrains from executing blocks 440 and 450 of the process 400 and therefore does not provide any prompt to the user 120 to report the incident.

At block 440, the electronic computing device 110 identifies a time window for prompting the user 120 to report the potential public-safety incident to the identified public-safety agency. In accordance with embodiments, the electronic computing device 110 identifies a time window as a function of one or more of user availability, user health and/or mental status, user convenience, user privacy, user safety, category or severity of the potential public-safety incident, or predefined user input. In other words, the electronic computing device 110 finds a right moment to remind the user about the incident. As an example, the electronic computing device 110 retrieves an electronic calendar associated with the user 120 and responsively identifies, from the electronic calendar, a time window during which the user 120 will be available to report the public-safety incident. As another example, the electronic computing device 110 processes sensor data captured via the one or more sensor devices 130 to monitor health status of the user 120 and responsively identifies a time window during which one or more health parameters (e.g., heart rate, stress level, user mood, emotional level etc.,) associated with the user 120 are within a normal range. As a further example, the electronic computing device 110 processes sensor data (e.g., video or audio data) captured via the one or more sensor devices 130 (e.g., camera, microphone etc.,) to monitor whether the user 120 is in proximity to other users and responsively identifies a time window during which the user is not in proximity to other users. In other words, in this example, the electronic computing device 110 identifies a time window during which the user will have privacy (e.g., to ensure anonymity) to report the incident. As another example, the electronic computing device 110 processes sensor data captured via the one or more sensor devices 130 (e.g., motion sensors) to monitor user's motion pattern and responsively identify a time window during which the user's motion pattern is normal. In this example, the electronic computing device 110 may not select a time window during which the user will be engaged in focused activities such as driving a vehicle, jogging, or exercising.

As another example, the electronic computing device 110 processes sensor data captured via the one or more sensor devices 130 to monitor a current location, of the user 120 and responsively identify a time window during which the current location matches with a predefined location. In this example, the predefined location may include a location (e.g., user's home or another location input by the user 120) that offers privacy for the user 120 to anonymously report the incident. As another example, the electronic computing device 110 processes sensor data captured via the one or more sensor devices 130 to monitor status of a vehicle occupied by a user and responsively identifies a time window during which the vehicle is not being operated by the user 120 or the vehicle is in a parked status. As another example, the electronic computing device 110 may also receive an input indicating one or more user-defined time windows and in response the electronic computing device 110 may select a time window (further as a function of one or more of user safety, availability, privacy, convenience, health, mental status etc.,) from the one or more user-defined time windows. In one embodiment, the electronic computing device 110 may prioritize user safety over user availability (or user health status over user convenience) in identifying a time window based on the nature of the public-safety incident. As an example, when the public-safety incident is an emergency incident that requires an urgent response from an identified public-safety agency, the electronic computing device 110 may select a nearest time window to prompt the user 120 to report the incident. The electronic computing device 110 selects a nearest time window that will be safe enough for the user 120 to report the incident even if the user's calendar indicates the user 120 has another meeting scheduled during the same time. In this example, the electronic computing device 110 prioritizes the need to report the incident on an urgent basis over user availability or user convenience.

At block 450, the electronic computing device 110 provides a visual and/or audio prompt reminding the user to report the potential public-safety incident to the identified public-safety agency during the identified time window. In accordance with some embodiments, the visual and/or audio prompt includes information identifying one or more of: an indication that the potential public-safety incident has been detected, sensor data (e.g., audio, video, text, or sensor values) based on which the potential public-safety event incident was detected, timestamp associated with the sensor data, location at which the sensor data was captured, identifier of the sensor device 130 which captured the sensor data. As an example, the visual and/or audio prompt may include a notification as follows: "you received this notification because your heart rate was outside the normal range today at 1:13 PM and further your device recognized the sound of a broken glass window at the store you visited today. If you suspect this as a public-safety incident, please call 911 or click this link to report the incident." The visual and/or audio prompt may be modified based on the profile of the user 120. As an example, the user profile may indicate that the user 120 prefers to have a simple reminder. In this case, the visual and/or audio prompt may include only a reminder to report the incident but the prompt may not include detailed information about the incident. As another example, the user profile may indicate that the user 120 prefers to receive an audio reminder but not a visual reminder. In this case, the electronic computing device 110 provides only an audio prompt (via an audio output component such as a speaker 222 shown in FIG. 2) to remind the user 120 to report the incident. Alternatively, the user 120 may prefer to receive a visual reminder. In this case, the electronic computing device 110 provides a visual prompt (via a visual output component such as a display screen 205 shown in FIG. 2) to remind the user 120 to report the incident. The electronic computing device 110 may also additionally adjust graphical user interface elements shown on a tip submission application based on the user profile. In one embodiment, the visual prompt may contain a link to an application (e.g., a call application or a tip submission application) that will allow the user 120 to report the public-safety incident by either submitting a tip or making a call to the public-safety agency identified by the electronic computing device 110. In this embodiment, the electronic computing device 110 may automatically launch, during the time window, the tip submission application with one or more fields in a tip submission form prefilled (e.g., time, location, category, and description of the incident) using the captured sensor data (e.g., audio, video, text, or sensor values). Similarly, the electronic computing device 110 may automatically launch, during the time window, the call application with a prefilled contact number (e.g., 911) of the public-safety agency identified by the electronic computing device 110. In one embodiment, the electronic computing device 110 may automatically update the user's calendar corresponding to the identified time window with a meeting invite to remind the user to report the incident. The meeting invite may include incident information which triggered the update to the user's calendar.

In accordance with some embodiments, prior to providing a visual and/or audio prompt reminding the user 120 to report the public-safety event, the electronic computing device 110 verifies that the user 120 has witnessed and/or experienced the potential public-safety incident. In one embodiment, the electronic computing device 110 verifies that the user 120 has witnessed and/or experienced the public-safety incident using the sensor data received from the sensor devices 130. For example, the electronic computing device 110 verifies that the user 120 has witnessed and/or experienced the public-safety incident when it detects, from sensor data received from a heart rate sensor, an abnormal increase in heart rate during and/or immediately after the occurrence of the public-safety incident. As another example, the electronic computing device 110 processes image, video, or audio captured corresponding to the user to determine the presence of the user substantially at the same time and/or location associated with the potential public-safety incident. Other possibilities exist as well.

Turning now to FIG. 5, a flowchart diagram illustrates a process 500 for prompting a user to report a public safety incident. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. The public-safety server 140 shown in FIG. 1 and/or FIG. 3, and embodied as a singular computing device or distributed computing device may execute process 500 via an electronic processor 313.

The public-safety server 140 may execute the process 500 at power-on, at some predetermined periodic time period thereafter, in response to a trigger raised locally at the public-safety server via an internal process or via an input interface or in response to a trigger from an external device to which the public-safety server 140 is communicably coupled, among other possibilities. In accordance with some embodiments, the public-safety server 140 may perform the process 500 only when a user (e.g., user 120) is registered with the public-safety server 140 and has authorized, the public-safety server 140 to prompt the user to respond to an incident witnessed by the user.

The process 500 of FIG. 5 need not be performed in the exact sequence as shown and likewise various blocks may be performed in different order or alternatively in parallel rather than in sequence. The process 500 may be implemented on variations of the system 100 of FIG. 1 as well.

At block 510, the public-safety server 140 captures sensor data via one or more sensor devices 150 communicatively coupled to the public-safety server 140. The sensor data may include audio, video, or other forms of sensor data captured by the sensor devices 150. In one embodiment, the sensor devices 130 may continuously, periodically, or in response to input from an authorized agency user, capture sensor data corresponding to a monitored area (e.g., an area within a jurisdiction of a public-safety agency) and send the captured sensor data for further processing by the public-safety server 140. The sensor data includes one or more of audio, video, text, or other forms of sensor data corresponding to the monitored area. In accordance with some embodiments, the sensor data may additionally include one or more of: sensor values (e.g., temperature) captured and/or measured by the sensor device, sensor analytics data (e.g., analytics data indicating an abnormal sensor value pattern), an identifier identifying a particular sensor device 150 which captured the sensor data, timestamp indicating a time at which the sensor data was captured, and a location (e.g., GPS coordinates) at which the sensor data was captured.

At block 520, the public-safety server 140 detects that the captured sensor data indicates occurrence of a potential public-safety incident. In accordance, with some embodiments, the electronic computing device 110 processes the sensor data received from one or more of the sensor devices 150 to determine whether the captured sensor data indicates occurrence of a potential public-safety incident. Assume a scenario where a vandalism incident occurs in an area monitored by the sensor devices 150 communicatively coupled to the public-safety server 140 and the incident involves one or more perpetrators breaking the glass window at a store front. In this scenario, it is possible that one or more of the sensor devices 150 deployed in the monitored area might have captured sensor data (e.g., audio, video, text, or other forms of sensor data) corresponding to the incident. For example, a sensor device 130 such as a surveillance camera deployed in the monitored area and communicatively coupled to the public-safety server 140 may capture video of the perpetrators committing the vandalism incident. When the electronic computing device 110 receives the sensor data from one or more of the sensor devices 150, the electronic computing device 110 processes the sensor data to determine whether the sensor data indicates an anomalous event such as an occurrence of a public-safety incident. In the above example scenario involving a vandalism incident, the electronic computing device 110 may process sensor data received from multiple sensor devices deployed at the monitored area during the time of occurrence of a particular event to verify occurrence of a potential public-safety incident. For example, the electronic computing device 110 may additionally process audio received from a microphone using an audio analytics engine and further determine that the audio which includes sound of the broken glass window is indicative of an occurrence of a potential vandalism incident.

At block 530, the public-safety server 140 identifies a user 120 who has witnessed and/or experienced the public-safety incident based on sensor data captured corresponding to the monitored area. For example, the public-safety server 140 may identify a user 120 by processing video captured corresponding to the monitored area by a surveillance camera substantially at the same time as the time of occurrence of the public-safety incident. In this example, the public-safety server may extract one or more identifiable characteristics (e.g., face) of a user 120 captured in the video and further determine whether the identifiable characteristics of the user match with one or more identifiable characteristics of the user 120 who is registered with the public-safety server 140 to receive a prompt to report an incident witnessed by the user 120. The public-safety server may also rely on sensor data captured by multiple sensor devices 150 to identify a registered user who has witnessed and/or experienced the public-safety incident. As another example, the public-safety server 140 may additionally identify a user 120 by processing audio captured corresponding to the monitored area by a microphone substantially at the same time as the time of occurrence of the public-safety incident. In this example, the public-safety server 140 may extract one or more audible characteristics (e.g., user's unique voice signature) captured in the video and further determine whether the audible characteristics match with one or more audible characteristics of the user 120 who is registered with the public-safety server 140 to receive a prompt to report an incident witnessed by the user 120. Other possibilities for identifying a registered user exist as well.

Next, at block 540, the electronic computing device 110 determines whether the user 120 registered with the public-safety server 140 has reported the potential public-safety incident to an identified public-safety agency. In accordance with embodiments, the public-safety server 140 identifies a particular public-safety agency as being responsible for responding, investigating, or resolving the public-safety incident detected by the public-safety server at block 420. The public-safety server 140 may identify a public-safety agency based on a category of public-safety incident detected at block 420. As an example, when the public-safety server 140 detects that the captured sensor data indicates a vandalism incident, the public-safety server 140 may categorize the vandalism incident as an emergency incident requiring a response from a police agency. After identifying the public-safety agency to which the incident is to be reported, the public-safety server 140 further monitors whether the user has reported the public-safety incident to the identified public-safety agency. In one embodiment, the public-safety server 140 may transmit a request to the electronic computing device 110 to monitor whether or not the user 120 has already reported the potential public-safety incident to the public-safety agency identified by the public-safety server 140. In response, the electronic computing device 110 performs the monitoring process as previously described with reference to the block 430 of process 400 shown in FIG. 4. The electronic computing device 110 then sends a response indicating whether or not the user 120 has already reported the potential public-safety incident to the public-safety agency identified by the public-safety server 140. In another embodiment, the public-safety server 140 determines that the user 120 has not reported the potential public-safety incident to an identified public-safety agency when a public-safety incident database (e.g., incident database 160) affiliated with the identified public-safety agency does not include an incident record (i.e., an incident record, containing specific information matching time, location, or category of the detected public-safety incident) linked to the potential public-safety incident.

At block 540, if the public-safety server 140 determines that the user 120 has not reported the public-safety incident, then the public-safety server 140 proceeds to execute blocks 550 and 560 of the process 500. On the other hand, if the public-safety server 140 determines that the public-safety incident has already been reported to a public-safety agency (e.g., police agency) identified by the public-safety server 140, then the public-safety server 140 refrains from executing blocks 550 and 560 of the process 500 and therefore does not prompt the user 120 to report the incident.

At block 550, the public-safety server 140 identifies a time window for reminding the user to report the potential public-safety incident to the identified public-safety agency. In accordance with some embodiments, the public-safety server 140 transmits a request to the electronic computing device 110 to identify a time window as a function of one or more of user availability, user health and/or mental status, user convenience, user privacy, user safety or seventy of the potential public-safety incident, or predefined user input. In response, the public-safety server 140 identifies a time window as previously described with reference to block 440 of the process 400. The electronic computing device 110 then transmits a response including the identified time window to the public-safety server 140.

At block 560, the public-safety server 140 transmits, during the time window identified at block 550, a visual and/or audio prompt reminding the user 120 to report the potential public-safety incident to the identified public-safety agency. In accordance with embodiments, the public-safety server 140 may transmit a request to the electronic computing device 110 operated by the user 120 to provide the visual and/or audio prompt to remind the user 120 to report the potential public-safety incident. The visual and/or audio prompt includes information identifying one or more of a indication that a potential public-safety event incident has been detected, sensor data (e.g., audio, video, text, or sensor values) based on which the potential public-safety event incident was detected, timestamp associated with the sensor data, location at which the sensor data was captured, identifier of the sensor device 150 which captured the sensor data. For example, the visual and/or audio prompt may read as follows: "you received this prompt because you may have witnessed a vandalism incident at 1:13 PM near the store you visited today. If you suspect this as a public-safety incident, please call 911 or click this link to report the incident." The visual and/or audio prompt may be modified based on the profile of the user 120. As an example, the user profile may indicate that the user 120 prefers to have a simple reminder. In this case, the visual and/or audio prompt may include a simple reminder to report the incident but without detailed information about the incident. As another example, the user profile may indicate that the user 120 prefers to receive an audio reminder but not a visual reminder. In this case, the public-safety server 140 may instruct the electronic computing device 110 to provide only an audio prompt, reminding the user 120 to report the incident. Alternatively, the user 120 may prefer to receive a visual reminder. In this case, the public-safety server 140 may instruct the electronic computing device 110 to provide a visual prompt reminding the user 120 to report the incident. The public-safety server 140 may also instruct the electronic computing device 110 to additionally adjust graphical user interface elements shown on a tip submission application based on the user profile. In one embodiment, the visual prompt may contain a link to an application (e.g., a call application or a tip submission application) that will allow the user 120 to report the public-safety incident by either submitting a tip or making a call to the public-safety agency identified by the public-safety server 140. In this embodiment, the public-safety server 140 instructs the electronic computing device 110 to automatically launch, during the time window, the tip submission application with one or more fields in a tip submission form prefilled (e.g., time, location, category, or description of the incident) using the captured sensor data (e.g., audio, video, text, or sensor values). The public-safety server 140 may also instruct the electronic computing device 110 to automatically launch, during the time window, the call application with a prefilled contact number (e.g., 911) of the public-safety agency identified by the electronic computing device 110. In one embodiment, the public-safety server 140 may instruct the electronic computing device 110 or a calendar server to automatically update the user's calendar corresponding to the identified time window with a meeting invite to remind the user 120 to report the incident. The meeting invite may include information which triggered the update to the user's calendar.

Embodiments of the present disclosure described herein can be advantageously implemented to increase engagement and strengthen collaboration between public-safety agencies and the citizens. As an example, assume a user observes an incident while driving a vehicle on a highway. In this case, when the user stops driving after a few moments from observing the incident, a mobile device operated by the user may automatically prompt the user to report the situation the user observed on the highway. As another example, assume a user witnesses an assault incident during a traffic stop, causing an abnormal increase in the user's heart rate as detected by the user's smart watch. In this case, the user's smart watch will wait until the user's heart rate returns to normal range to ensure the user is relaxed before prompting the user to report the incident witnessed by the user. As a further example, assume a user hears conversations from inside a public restroom possibly indicating a plan to commit an illegal activity. In this case, the user's mobile device may capture the conversations and detect an occurrence of a potential public-safety incident. If the user has not already reported the incident, the user's mobile phone may wait until the user has reached her home or another safe location before prompting the user to report the conversations heard by the user. Accordingly, embodiments of the present disclosure can be implemented in different user scenarios to automatically prompt the user to report an incident witnessed and/or experienced by the user.

As should be apparent from this detailed description, the operations and functions of the computing devices described herein are sufficiently complex as to require their implementation on a computer system, and cannot be performed, as a practical matter, in the human mind. Electronic computing systems such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in Which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of prompting a user to report a public-safety incident, comprising:
    capturing, at an electronic computing device, sensor data via one or more sensor devices communicatively coupled to the electronic computing device;
    detecting, at the electronic computing device, that the captured sensor data indicates an occurrence of a potential public-safety incident;
    determining, at the electronic computing device, that a user operating the electronic computing device has not reported the potential public-safety incident to an identified public-safety agency;
    identifying, at the electronic computing device, a time window for prompting the user to report the potential public-safety incident to the identified public-safety agency; and
    providing, at, the electronic computing device, during the identified time window, a visual and/or audio prompt for prompting the user to report the potential public-safety incident to the identified public-safety agency.

2. The method of claim 1, wherein determining comprises:
    determining that the user has not submitted a tip linked to the potential public-safety incident, or
    determining that the user has not made a call to the identified public-safety agency.

3. The method of claim 1, wherein identifying the time window comprises:
    identifying the time window as a function of one or more of user availability, user health and/or mental status, user convenience, user privacy, user safety, type or severity of the potential public-safety incident, or a predefined user input.

4. The method of claim 3, wherein identifying the time window as a function of one or more of user availability, user health and/or mental status, user convenience, user privacy, user safety or severity of the potential public-safety incident, or predefined user input comprises one or more of
    retrieving an electronic calendar associated with the user and responsively identifying, from the electronic calendar, the time window during which the user will be available to report the public-safety incident;
    processing sensor data captured via the one or more sensor devices to monitor health status of the user and responsively identifying the time window during which one or more health parameters associated with the user are within a normal range;
    processing sensor data captured via the one or more sensor devices to monitor whether the user is in proximity to other users and responsively identifying the time window during which the user is not in proximity to other users;
    processing sensor data captured via the one or more sensor devices to monitor user's motion pattern and responsively identifying the time window during which the user's motion pattern is normal;
    processing sensor data captured via the one or more sensor devices to monitor a current location of the user and responsively identifying the time window during which the current location matches with a predefined private location;
    processing sensor data captured via the one or more sensor devices to monitor status of a vehicle occupied by a user and responsively identifying the time window during which the vehicle is in a parked status; and receiving an input indicating one or more user-defined time windows and responsively selecting the time window from the one or more user-defined time, windows.

5. The method of claim 1, wherein the visual and/or audio prompt includes information identifying one or more of the potential public-safety incident, the sensor data based on which the potential public-safety event incident was detected, timestamp associated with the sensor data, location at which the sensor data was captured, identifier of the sensor device which captured the sensor data.

6. The method of claim 1, wherein the visual and/or audio prompt is modified based on a profile of the user.

7. The method of claim 1, wherein the visual and/or audio prompt contains a link or an instruction to find a link to an application that will allow the user to report the public-safety incident by either submitting a tip or making a call to the identified public-safety agency.

8. The method of claim 7, wherein the application is a tip submission application, the method further comprising:
   automatically launching, during the time window, the tip submission application with one or more fields in a tip submission form prefilled using the captured sensor data.

9. The method of claim 7, wherein the application is a call application, the method further comprising:
   automatically launching, during the time window, the call application with a prefilled contact number of the identified public-safety agency.

10. The method of claim 1, determining, at the electronic computing device, that the user operating the electronic computing device has not reported the potential public-safety incident to an identified public-safety agency, comprises:
    obtaining permission to temporarily access a public-safety incident database affiliated with the identified public-safety agency;
    determining that the public-safety incident database already includes one or more incident records linked to the potential public-safety incident; and
    determining that the one or more incident records linked to the potential public-safety incident is missing relevant incident information captured in the sensor data.

11. The method of claim 1, further comprising:
    prior to providing the visual and/or audio prompt to the user to report the potential public-safety incident, verifying that the user has witnessed and/or experienced the potential public-safety incident.

12. The method of claim 11, wherein verifying comprises:
    detecting, based on sensor data captured via the one or more sensor devices, an abnormal increase in heart rate during and/or immediately after the occurrence of the potential public-safety incident.

13. The method of claim 1, wherein the sensor data includes an image, an audio, or a video captured corresponding to the potential public-safety incident.

14. An electronic computing device, comprising:
    one or more sensor devices;
    a visual and/or audio output component; and
    an electronic processor communicatively coupled to the one or more sensor devices and the visual and/or audio output component, the electronic processor configured to:
    capture sensor data via the one or more sensor devices;
    detect that the captured sensor data indicates an occurrence of a potential public-safety incident;
    determine that a user operating the electronic computing device has not reported the potential public-safety incident to an identified public-safety agency;
    identify a time window for prompting the user to report the potential public-safety incident to the identified public-safety agency; and
    provide, via the visual and/or audio output component, a visual and/or audio prompt for prompting the user to report the potential public-safety incident to the identified public-safety agency.

15. The electronic computing device of claim 14, wherein the electronic processor is configured to identify the time window as a function of one or more of user availability, user health and/or mental status, user convenience, user privacy, user safety, type or severity of the potential public-safety incident, or a predefined, user input.

16. The electronic computing device of claim 14, wherein the electronic processor is configured to automatically launch, during the time window, a tip submission application with one or more fields in a tip submission form prefilled using the captured sensor data.

17. The electronic computing device of claim 14, wherein the electronic processor is configured to verify that the user has witnessed and/or experienced the potential public-safety incident prior to providing the visual and/or audio prompt to the user to report the potential public-safety incident.

18. A method of prompting a user to report a public-safety incident, the method comprising:
    capturing, at a public-safety server, sensor data via one or more sensor devices communicatively coupled to the public-safety server;
    detecting, at the public-safety server, that the captured sensor data indicates occurrence of a potential public-safety incident;
    identifying, at, the public-safety server, a user who has witnessed and/or experienced the potential public-safety incident;
    determining, at the public-safety server, that the user has not reported the potential public-safety incident to an identified public-safety agency;
    identifying, at the public-safety server, a time window for prompting the user to report the potential public-safety incident to the identified public-safety agency; and
    transmitting, at the public-safety server, during the identified time window, a visual and/or audio prompt to an electronic computing device operated, by the user for prompting the user to report the potential public-safety incident to the identified public-safety agency.

19. The method of claim 18, wherein determining that the user has not reported the potential public-safety incident, to an identified public-safety agency comprises:
    determining that an incident database affiliated with the identified public-safety agency does not include an incident record linked to the potential public-safety incident.

20. The method of claim 18, wherein identifying the user who has witnessed and/or experienced the potential public-safety incident, comprises:
    obtaining sensor data including an image, video, or audio captured corresponding to the potential public-safety incident; and
    processing the sensor data to determine the presence of the user substantially at the same time and/or location associated with the public-safety incident.

* * * * *